(12) United States Patent
Westfall

(10) Patent No.: US 11,491,919 B2
(45) Date of Patent: Nov. 8, 2022

(54) SYSTEMS AND METHODS FOR DEPLOYING PARCEL TRAYS ON HINGED VEHICLE CLOSURE MEMBERS

(71) Applicant: FORD GLOBAL TECHNOLOGIES, LLC, Dearborn, MI (US)

(72) Inventor: Christopher R. Westfall, Mountain View, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 134 days.

(21) Appl. No.: 17/093,728

(22) Filed: Nov. 10, 2020

(65) Prior Publication Data

US 2022/0144179 A1    May 12, 2022

(51) Int. Cl.
*B60R 7/04* (2006.01)
*B60R 7/08* (2006.01)

(52) U.S. Cl.
CPC ............... *B60R 7/046* (2013.01); *B60R 7/08* (2013.01)

(58) Field of Classification Search
CPC ...... B60R 7/046; E05C 17/003; E05C 17/006
USPC ............. 296/37.13, 152, 24.44, 24.45, 146.4
See application file for complete search history.

(56) References Cited

U.S. PATENT DOCUMENTS

| | | | | |
|---|---|---|---|---|
| 5,795,005 A * | 8/1998 | Garfias | ................... | B60R 7/046 312/275 |
| 6,145,919 A * | 11/2000 | Mysliwiec | ............... | B60N 2/78 296/153 |
| 6,848,525 B1 * | 2/2005 | Peterson | ................ | B62D 25/12 180/69.2 |
| 9,217,271 B2 * | 12/2015 | Heissler | ................ | E05F 15/619 |
| 9,650,826 B2 * | 5/2017 | Potter | ................... | E05F 15/614 |
| 9,834,978 B2 | 12/2017 | Nania | | |
| 10,286,851 B2 * | 5/2019 | Koo | .......................... | B60R 7/08 |
| 10,328,860 B2 * | 6/2019 | Lewis | ....................... | B60J 5/105 |
| 10,351,067 B2 * | 7/2019 | Koo | ......................... | B60R 11/02 |
| 10,378,263 B2 | 8/2019 | Podkopayev | | |
| 10,427,612 B2 * | 10/2019 | Akdag Cakir | .......... | B60R 7/046 |
| 10,655,378 B2 * | 5/2020 | Podkopayev | ........... | F16H 25/20 |
| 11,117,525 B2 * | 9/2021 | Koehler | .............. | B60R 13/0243 |
| 11,242,011 B2 * | 2/2022 | Cho | .......................... | B60R 7/04 |
| 2019/0143869 A1 * | 5/2019 | Sequi | ................... | B60R 13/0243 296/152 |
| 2021/0378890 A1 * | 12/2021 | Bouzige | ................... | B60N 3/06 |
| 2022/0032849 A1 * | 2/2022 | Lewis | ..................... | B60J 5/105 |

FOREIGN PATENT DOCUMENTS

CN    211196014 U    8/2020
KR    101925299 B1    12/2018

* cited by examiner

*Primary Examiner* — Jason S Morrow
(74) *Attorney, Agent, or Firm* — Vichit Chea; Carlson, Gaskey & Olds, P.C.

(57) ABSTRACT

Vehicle parcel tray systems may be provided for exchanging goods or other items between authorized users and the vehicle. A parcel tray of the parcel tray system may be automatically deployed for exchanging the goods or other items as part of an automated delivery process. The parcel tray may be configured to move in unison with a vehicle closure member via an actuator system that operably links movement of the parcel tray with that of the closure member.

17 Claims, 9 Drawing Sheets

SYSTEMS AND METHODS FOR DEPLOYING PARCEL TRAYS ON HINGED VEHICLE CLOSURE MEMBERS

TECHNICAL FIELD

This disclosure relates to motor vehicles, and more particularly to systems and methods for automatically deploying a parcel tray on a hinged vehicle closure member.

BACKGROUND

Vehicles typically include one or more closure members. Exemplary closure members are doors, swing gates, and liftgates. Generally, closure members can move back and forth between open and closed positions relative to a body structure of the vehicle in order to provide vehicle ingress/egress. Some closure members can be moved with powered actuators.

SUMMARY

A vehicle parcel tray system according to an exemplary aspect of the present disclosure includes, among other things, a closure member, a parcel tray mounted to the closure member, and an actuator system adapted to move the closure member and the parcel tray in unison with one another.

In a further non-limiting embodiment of the foregoing vehicle parcel tray system, the closure member is a vehicle side door.

In a further non-limiting embodiment of either of the foregoing vehicle parcel tray systems, the parcel tray is mounted to the closure member by an attaching plate.

In a further non-limiting embodiment of any of the foregoing vehicle parcel tray systems, the actuator system includes an electric linear actuator, a roller wheel assembly, and a track.

In a further non-limiting embodiment of any of the foregoing vehicle parcel tray systems, the roller wheel assembly is pivotably connected to the electric linear actuator.

In a further non-limiting embodiment of any of the foregoing vehicle parcel tray systems, a roller wheel of the roller wheel assembly is movably received within the track.

In a further non-limiting embodiment of any of the foregoing vehicle parcel tray systems, the track is fixedly mounted to an interior side of the closure member or to an attaching plate that is mounted between the parcel tray and the interior side.

In a further non-limiting embodiment of any of the foregoing vehicle parcel tray systems, the roller wheel is configured to move in each of a first direction and a second direction within the track.

In a further non-limiting embodiment of any of the foregoing vehicle parcel tray systems, at least two support devices are disposed between a platform of the parcel tray and a vehicle body structure.

In a further non-limiting embodiment of any of the foregoing vehicle parcel tray systems, the at least two support devices include roller balls.

In a further non-limiting embodiment of any of the foregoing vehicle parcel tray systems, the parcel tray includes a platform and at least one shelving unit.

In a further non-limiting embodiment of any of the foregoing vehicle parcel tray systems, a control module is configured to control movement of the closure member and the parcel tray in unison with one another as part of an automated delivery process.

A vehicle according to another exemplary aspect of the present disclosure includes, among other things, a vehicle body, a closure member pivotably mounted relative to the vehicle body, a parcel tray mounted relative to the closure member, and an electric actuator system configured to move the closure member and the parcel tray in unison with one another over a range of motion between a closed position and an open position.

In a further non-limiting embodiment of the foregoing vehicle, the vehicle is an autonomous vehicle.

In a further non-limiting embodiment of either of the foregoing vehicles, the electric actuator system includes an electric linear actuator, a roller wheel assembly, and a track.

In a further non-limiting embodiment of any of the foregoing vehicles, the roller wheel assembly is pivotably connected a drive shaft of the electric linear actuator and includes a roller wheel movably received within the track for establishing an adjustable connection point between the closure member and the electric linear actuator.

In a further non-limiting embodiment of any of the foregoing vehicles, the track is secured to an attaching plate that is mounted to the closure member.

In a further non-limiting embodiment of any of the foregoing vehicles, the parcel tray is supported relative to a structure of the vehicle body by at least two support devices.

In a further non-limiting embodiment of any of the foregoing vehicles, a control module is configured to command the electric actuator system to move the closure member and the parcel tray in unison in response to receiving a predefined prompt that indicates an authorized user desires to exchange an item with the vehicle.

A method according to another exemplary aspect of the present disclosure includes, among other things, automatically deploying a parcel tray as a vehicle closure member is moved from a closed position to an open position. Automatically deploying the parcel tray includes moving a roller wheel of an actuator system within a track that is secured relative to the vehicle closure member.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary vehicle parcel tray systems for exchanging goods or other items between authorized users and the vehicle. A parcel tray of the parcel tray system may be automatically deployed for exchanging the goods or other items as part of an automated delivery process. The parcel tray may be configured to move in unison with a vehicle closure member via an actuator system that operably links movement of the parcel tray with that of the closure member. These and other features of this disclosure are described in greater detail below.

Figure 1:
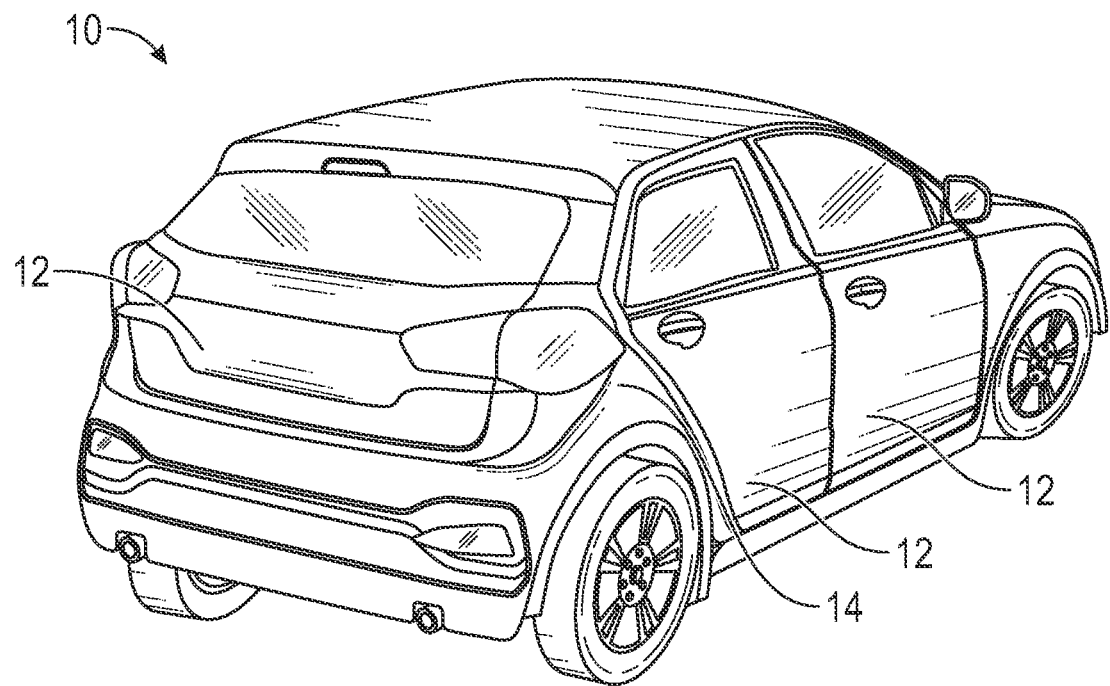
FIG. 1 illustrates a vehicle equipped with a parcel tray system. The parcel tray system is in a closed position in FIG. 1.
Figure 2:
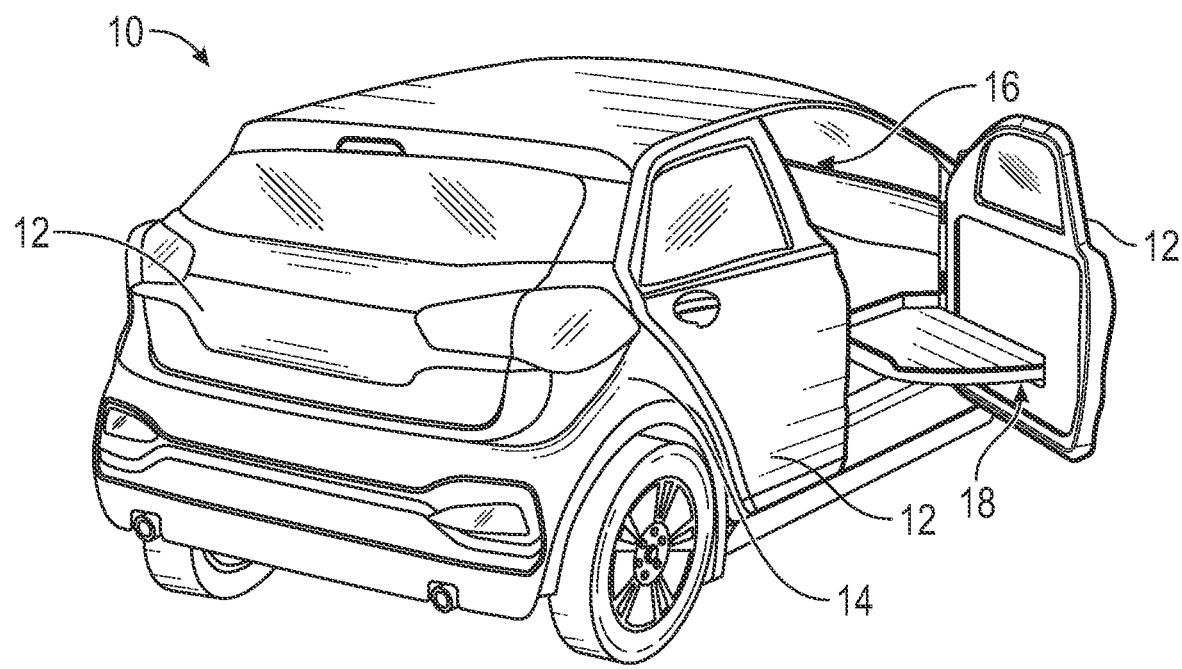
FIG. 2 illustrated the parcel tray system of FIG. 1 in an open position.

FIGS. 1 and 2 schematically illustrate a vehicle 10. The vehicle 10 may be a car, a truck, a van, a sport utility vehicle, or any other type of vehicle. The vehicle 10 could also be a conventional motor vehicle, a traction battery powered hybrid or electric vehicle, or an autonomous vehicle (i.e., a driverless vehicle).

Although a specific component relationship is illustrated in the figures of this disclosure, the illustrations are not intended to limit this disclosure. In other words, the placement and orientation of the various components of the vehicle 10 are shown schematically and could vary within the scope of this disclosure. In addition, the various figures accompanying this disclosure are not necessarily drawn to scale, and some features may be exaggerated or minimized to emphasize certain details of a particular component.

The vehicle 10 includes various closure members 12 that are mounted relative to a vehicle body 14 and configured to move between closed and open positions for accessing a vehicle interior (e.g., a passenger cabin 16). In the illustrated embodiment, the closure members 12 are side doors of the vehicle 10. Other exemplary closure members include liftgates, tailgates, swing gates, etc.

Each closure member 12 is configured to selectively open and close relative to the vehicle body 14 via a hinged connection. The closure members 12 are shown in a closed position in FIG. 1 and in an open position in FIG. 2. When opened, the closure members 12 permit users to gain access, such as for ingress or egress, to the passenger cabin 16 of the vehicle 10. When closed, the closure members 12 provide a boundary barrier between the passenger cabin 16 and the exterior of the vehicle 10.

One or more of the closure members 12 may be part of a parcel tray system 18 of the vehicle 10. The parcel tray system 18 can be automatically moved between closed and open positions relative to the vehicle body 14 for permitting users to either place a package, goods, or other cargo items within the vehicle 10 or remove the package, goods, or other cargo items from the vehicle 10. The vehicle 10 can thus be utilized for delivering or picking up goods, packages, etc.

In the illustrated embodiment of FIGS. 1 and 2, the front passenger side door is the closure member 12 that is part of the parcel tray system 18. However, any of the closure members 12 of the vehicle 10 could be part of the parcel tray system 18. The embodiment shown in FIG. 3, for example, illustrates the rear passenger side door as the closure member 12 that is part of the parcel tray system 18. In another embodiment, multiple closure members 12 of the vehicle 10 can be part of a parcel tray system 18 of the vehicle 10.

Figure 3:
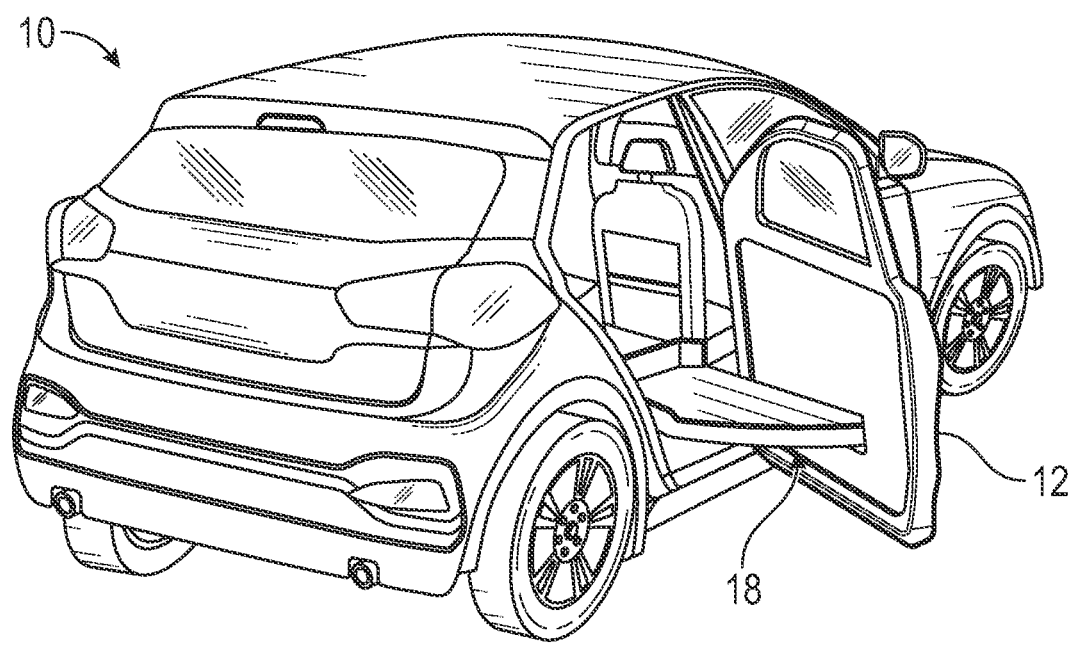
FIG. 3 illustrates another exemplary parcel tray system for a vehicle.
Figure 4:
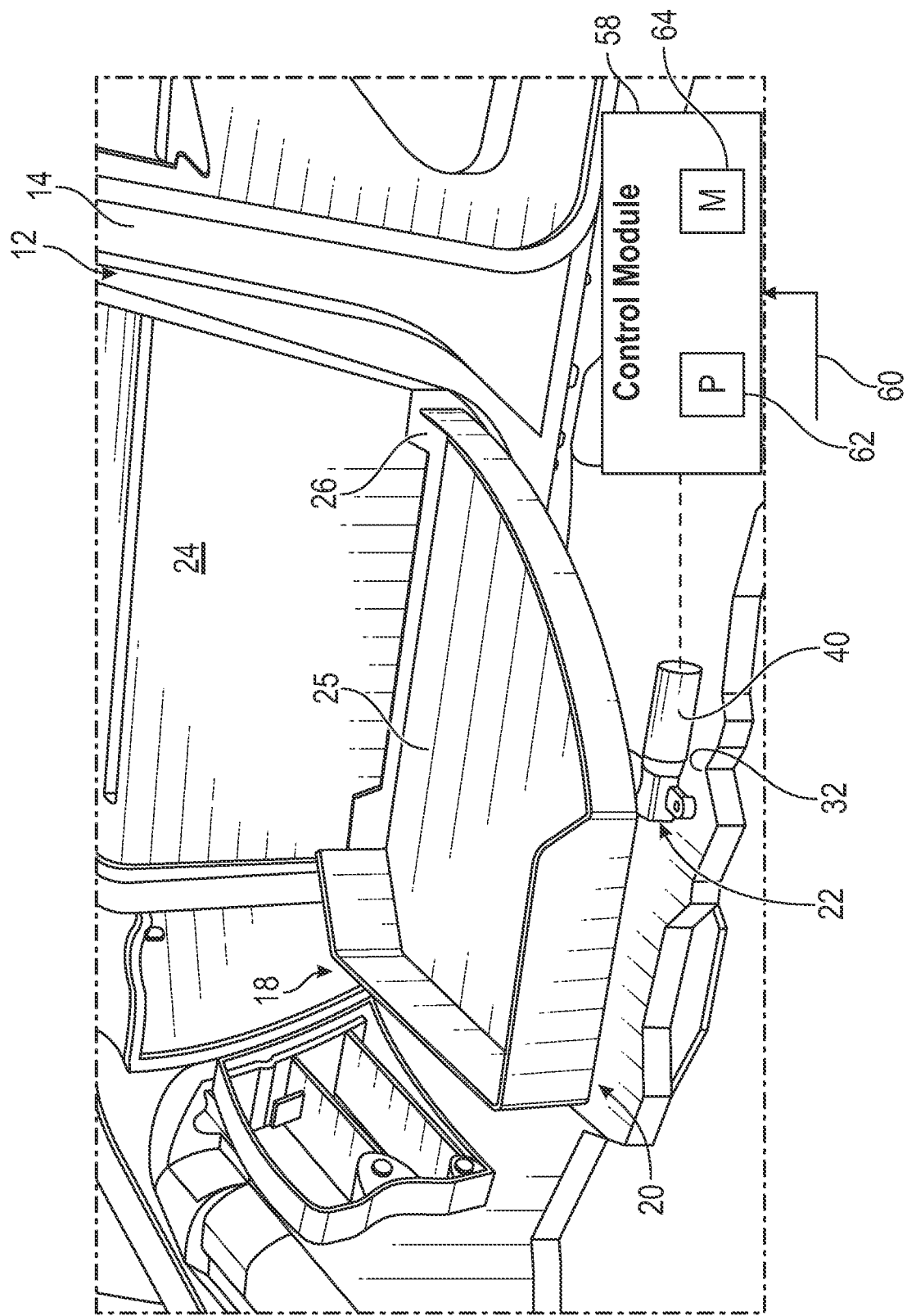
FIG. 4 further illustrates an exemplary parcel tray system for a vehicle.
Figure 5:
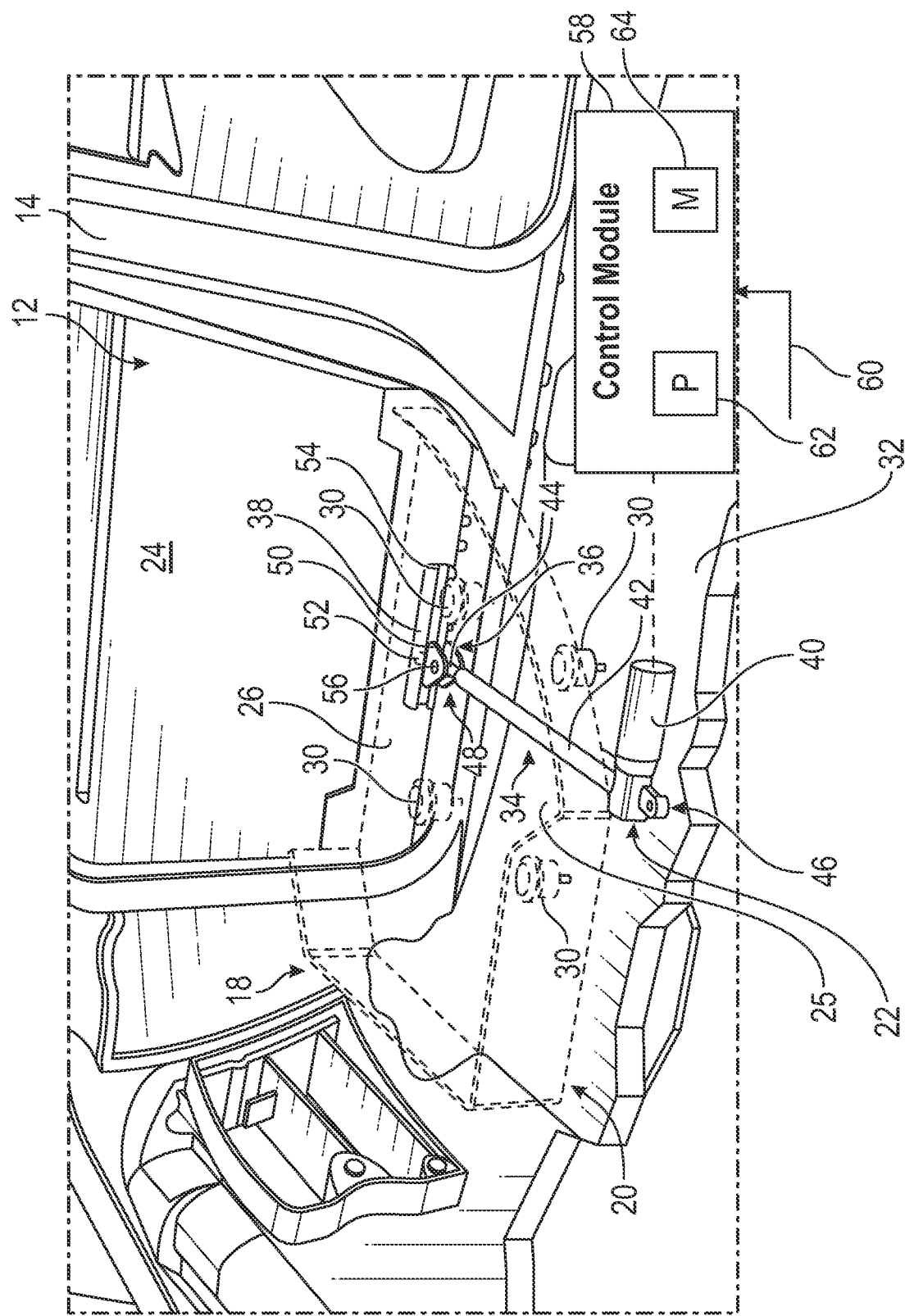
FIGS. 5 and 6 illustrate an exemplary actuator system of the parcel tray system of FIG. 4.
Figure 6:
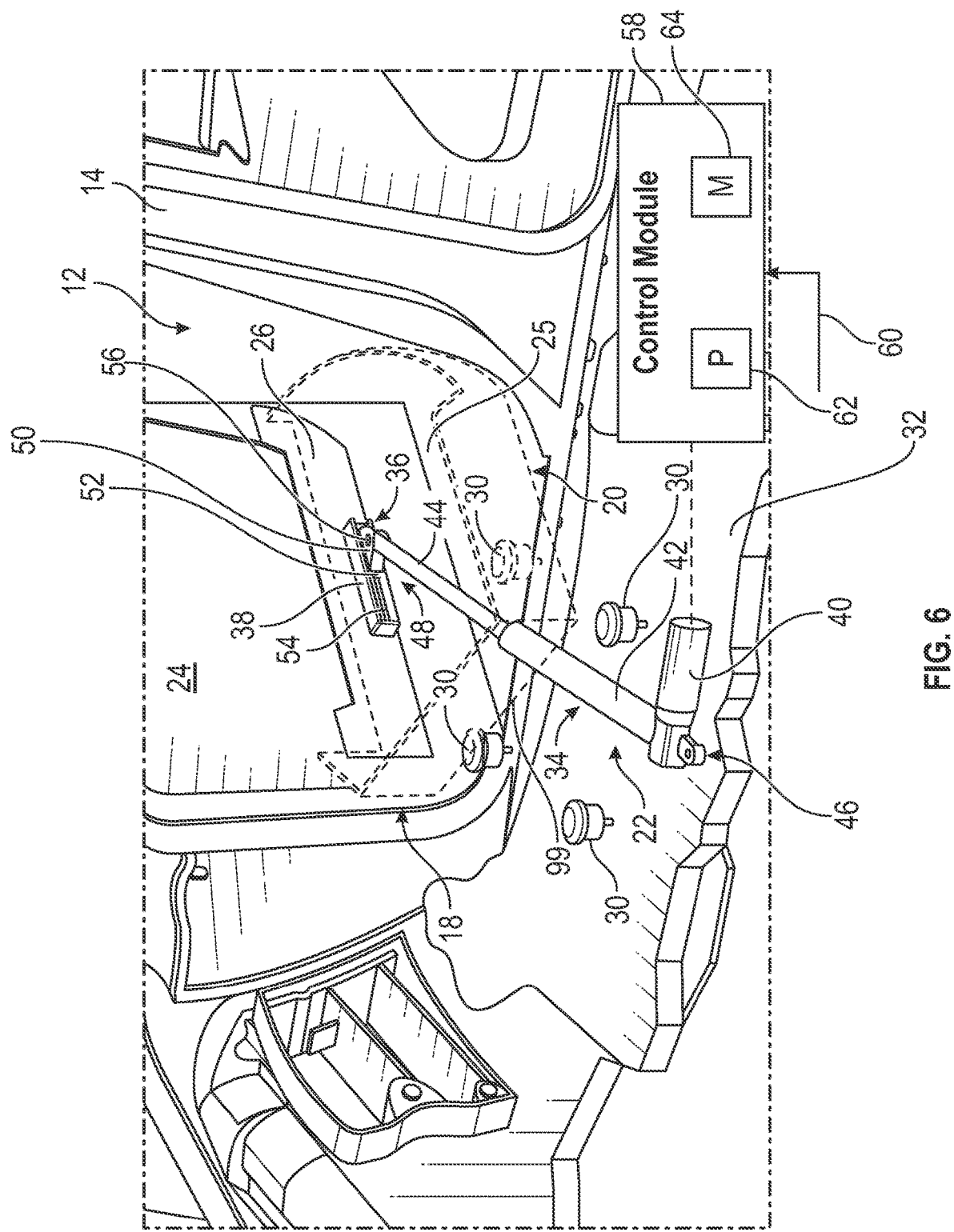

An exemplary parcel tray system 18 is further illustrated in FIGS. 4, 5, and 6 (with continued reference to FIGS. 1-3). The parcel tray system 18 may include a closure member 12, a tray 20, support devices 30, and an actuator system 22. The parcel tray system 18 is illustrated in a closed position relative to the vehicle body 14 in FIGS. 4 and 5 and is illustrated in an open position relative to the vehicle body 14 in FIG. 6.

The tray 20 of the parcel tray system 18 provides a space or volume for storing packages, goods, cargo items, etc. within the passenger cabin 16 of the vehicle 10. The tray 20 may be fixedly mounted to an interior side 24 of the closure member 12 by an attaching plate 26. The attaching plate 26 may be integrally formed with the tray 20, integrally formed with the closure member 12, or could be a completely separate component from either the tray 20 or the closure member 12. In other embodiments, the tray 20 may be affixed directly to the interior side 24 of the closure member 12.

Figure 7:
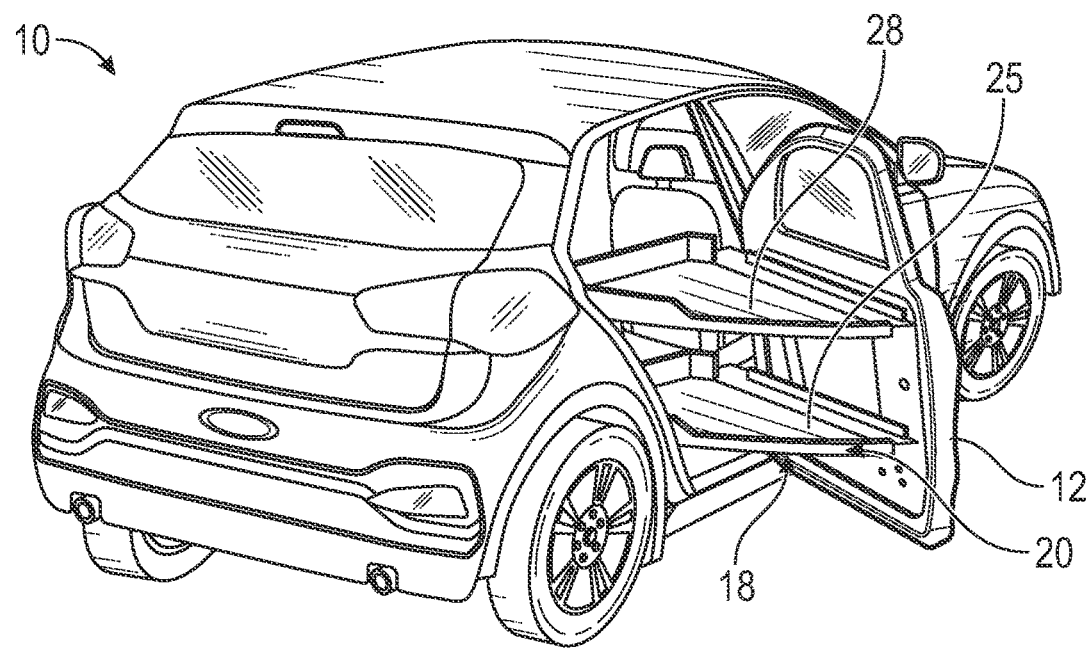
FIG. 7 illustrates an exemplary shelving unit of a parcel tray system.
Figure 8:
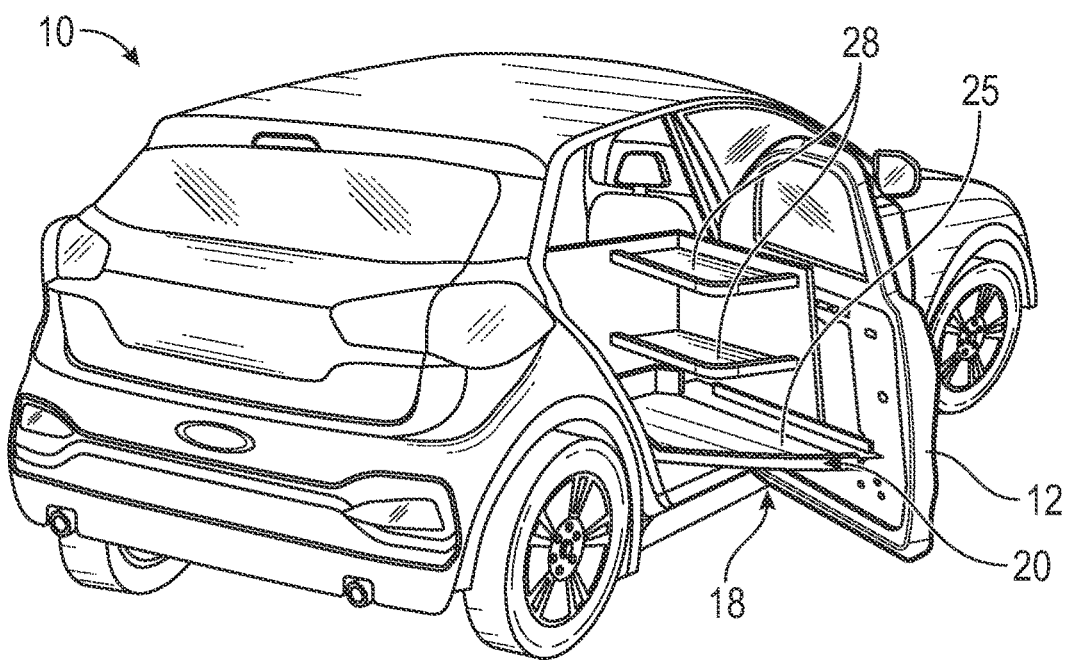
FIG. 8 illustrates another exemplary shelving unit of a parcel tray system

The tray 20 may be configured as either a single-tier component or a multi-tiered component. For example, the tray 20 of FIGS. 4, 5, 6 is a single-tier tray unit that includes a single platform 25, whereas the tray 20 of FIGS. 7 and 8 is a multi-tiered tray unit that includes one or more shelving units 28 arranged above the platform 25. Other tray configurations than those illustrated by the exemplary embodiments of FIGS. 4-8 are further contemplated within the scope of this disclosure.

The tray 20 of the parcel tray system 18 may be supported relative to the vehicle body 14 by two or more of the support devices 30. The support devices 30 may be disposed between the platform 25 of the tray 20 and a structure 32 (e.g., floor board, frame member, etc.) of the vehicle body 14 for both supporting the tray 20 and guiding the movement of the tray 20 as the parcel tray system 18 moves between the closed and open positions. The support devices 30 may be fixedly mounted relative to both the platform 25 and the structure 32 in any manner.

In an embodiment, the support devices 30 are roller balls that are capable of rotating over a range of 360 degrees for providing a smooth motion path as the closure member 12/tray 20 move between the closed and open positions. However, other types of support devices are also contemplated within the scope of this disclosure. At least one of the support devices 30 may support an edge 99 of the tray 20 when the parcel tray system 18 is moved to the open position (see, e.g., FIG. 6).

The actuator system 22 is configured to move the closure member 12 and the tray 20 in unison with one another between the closed and open positions. The actuator system 22 may include an electric linear actuator 34, a roller wheel assembly 36, and a track 38.

The electric linear actuator 34 may include an electric motor 40, an outer tube 42, and a drive shaft 44. The electric motor 40 may be selectively powered to translate the drive shaft 44 relative to the outer tube 42, thereby moving the closure member 12 and the tray 20 in unison between the closed and open positions. The total length of outward travel of the drive shaft 44 relative to the outer tube 42 may vary and is dependent on various design criteria, such as the mounting position of the electric linear actuator 34 relative to a hinge point of the closure member 12 and the desired range of motion of the closure member 12, among other design criteria.

A proximal end portion 46 of the electric linear actuator 34 may be fixedly secured to the structure 32 of the vehicle body 14. The exact mounting location of the proximal end portion 46 is flexible per specific design and may vary relative to the hinge point of the closure member 12 for achieving a desired range of motion.

The roller wheel assembly 36 may be pivotably mounted at a distal end portion 48 of the drive shaft 44 of the electric linear actuator 34. The roller wheel assembly 36 may include an outer housing 50 and one or more roller wheels 52 rotatably mounted within the outer housing 50. The outer housing 50 may be pivotably connected to the distal end portion 48 of the drive shaft 44 via a cylindrical attachment point 56. The roller wheels 52 may be movably received within the track 38. The roller wheel assembly 36 and the track 38 thus establish an adjustable connection point between the closure member 12 and the electric linear actuator 34 for moving the closure member 12 and the tray 20 in unison along a smooth motion path.

The track 38 may be mounted to the attaching plate 26 or directly to the interior side 24 of the closure member 12. The mounting location and overall length of the track 38 may vary depending on the desired range of motion of the parcel tray system 18, among other factors.

The track 38 may include an elongated slot 54 configured for receiving the one or more roller wheels 52 of the roller wheel assembly 36. The position of the roller wheels 52 within the elongated slot 54 may be automatically adjusted as the closure member 12 rotates along its arced path, thereby enabling a low rolling resistance relative to the track 38 and the closure member 12 for smooth movement of the parcel tray system 18 between the open and closed positions.

Automated operations of the parcel tray system 18 for exchanging goods or other items with the vehicle 10 may be controlled by a control module 58 of the vehicle 10. For example, the actuator system 22 of the parcel tray system 18 may be commanded to automatically move the parcel tray system 18 between the closed and open positions in response to a predefined prompt 60 received at the control module 58. The predefined prompt 60 indicates that an authorized user desires to either place a package, goods, or other cargo within the tray 20 of the parcel tray system 18 or remove the package, goods, or other cargo from the tray 20, and thus that the parcel tray system 18 should be commanded to move to the open position.

The control module 58 may be operatively connected to the electric motor 40 of the electric linear actuator 34 and may be equipped with executable instructions for interfacing with and commanding operation of the electric linear actuator 34. The control module 58 may include a processing unit 62 and non-transitory memory 64 for executing the various control strategies and modes of the parcel tray system 18. The processing unit 62 can be programmed to execute one or more programs stored in the memory 64. The programs may be stored in the memory 64 as software code, for example. Each program stored in the memory 64 may include an ordered list of executable instructions for implementing logical functions associated with opening and closing the parcel tray system 18. The processing unit 62 can be a custom made or commercially available processor, a central processing unit (CPU), or generally any device for executing software instructions. The memory 64 can include any one or combination of volatile memory elements and/or nonvolatile memory elements.

FIGS. 9A, 9B, 9C, and 9D schematically illustrate the movement of the parcel tray system 18 between the closed and open positions. The parcel tray system 18 is shown in a fully closed position P1 in FIG. 9A. In this position, the roller wheels 52 are situated in a neutral, resting position within the track 38 (see inset A of FIG. 9A). Since the closure member 12/tray 20 have not yet started to move, the outer housing 50 of the roller wheel assembly 36 is non-angled and thus substantially parallel relative to the interior side 24 of the closure member 12.

Figure 9A:
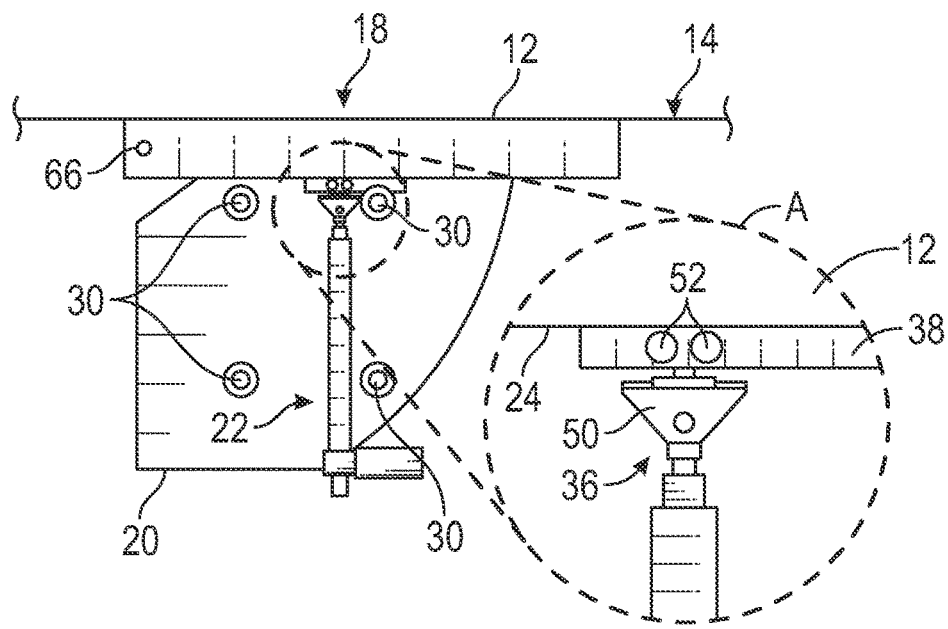
FIGS. 9A, 9B, 9C, and 9D schematically illustrate movement of a parcel tray system between a closed position and an open position.
Figure 9B:
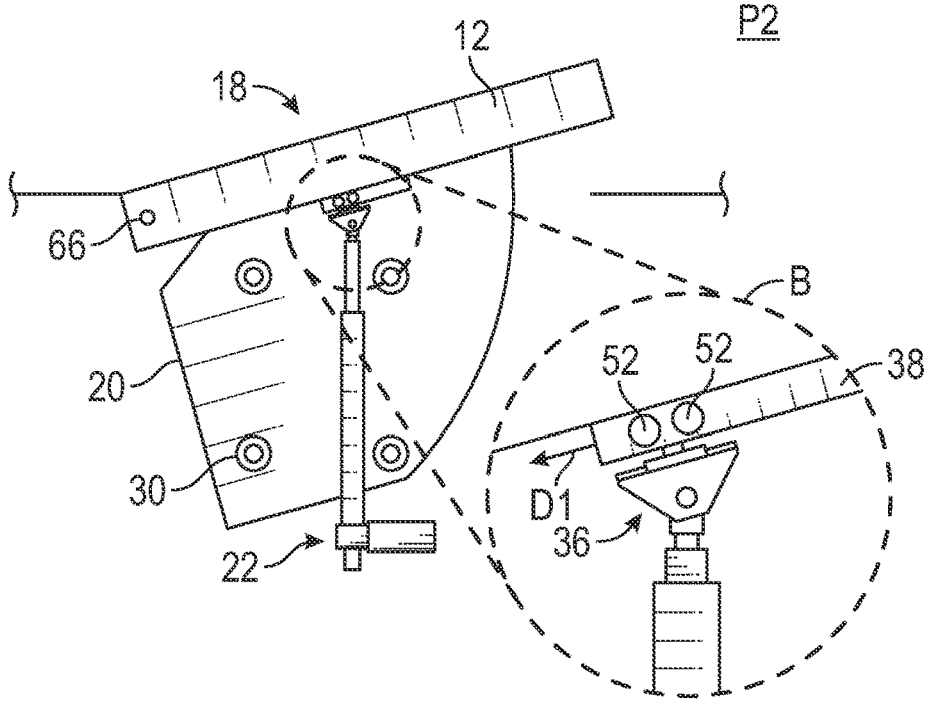

FIG. 9B illustrates the parcel tray system 18 in a first intermediate position P2. The first intermediate position P2 is a position in which the closure member 12/tray 20 have just begin to move toward a fully open position. In this position, the roller wheels 52 are automatically forced to oscillate or otherwise move in a first direction D1 within the track 38 (see inset B of FIG. 9B). In an embodiment, the first direction D1 is generally toward a pivot point 66 of the closure member 12.

Figure 9C:
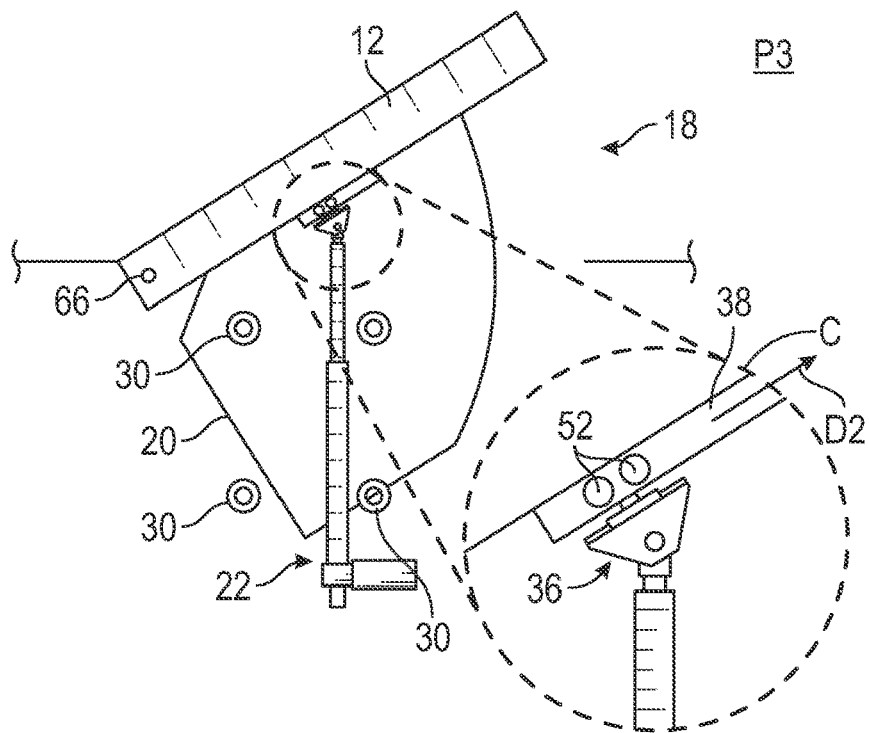

FIG. 9C illustrates the parcel tray system 18 in a second intermediate position P3. The second intermediate position P3 is a position in which the closure member 12/tray 20 has moved from the first intermediate position P2 further toward the fully open position. In this position, the roller wheels 52 are automatically forced to oscillate or otherwise move in a second direction D2 within the track 38 (see inset C of FIG. 9C). In an embodiment, the second direction D2 is opposite from the first direction D1 and is thus generally in a direction away from the pivot point 66 of the closure member 12. In general, the back and forth movement of the roller wheels 52 in the directions D1 and D2 is a result of the pivot point 66 of the closure member 12 being located outboard of the roller wheel assembly 36.

Figure 9D:
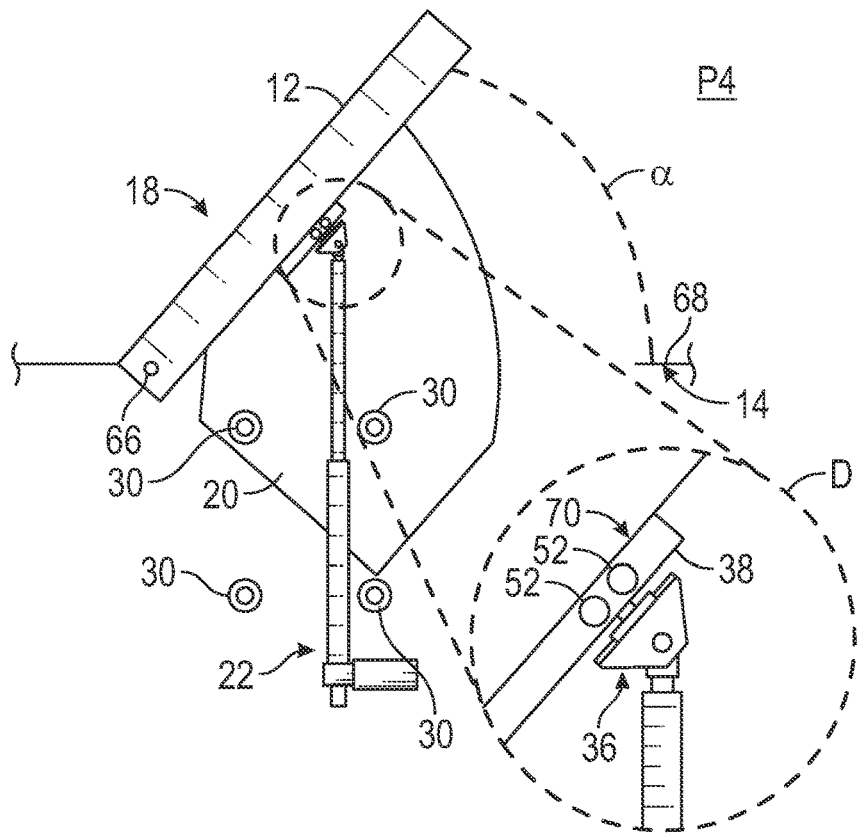

FIG. 9D shows the parcel tray system 18 in a fully open position P4. The fully open position P4 is a position at which the closure member 12 has moved over its full range of motion a. The full range of motion a may be between 50° and 70° relative to an exterior surface 68 of the vehicle body 14, in an embodiment. However, other ranges of motion are also contemplated within the scope of this disclosure. In the fully open position P4, the roller wheels 52 are automatically moved to a distal location 70 of the track 38 (see inset D of FIG. 9D).

Although four specific positions P1 to P4 are illustrated in FIGS. 9A to 9D, it should be recognized that the parcel tray systems 18 of this disclosure could be opened to any position between the fully closed position P1 and the fully open position P4.

Figure 10:
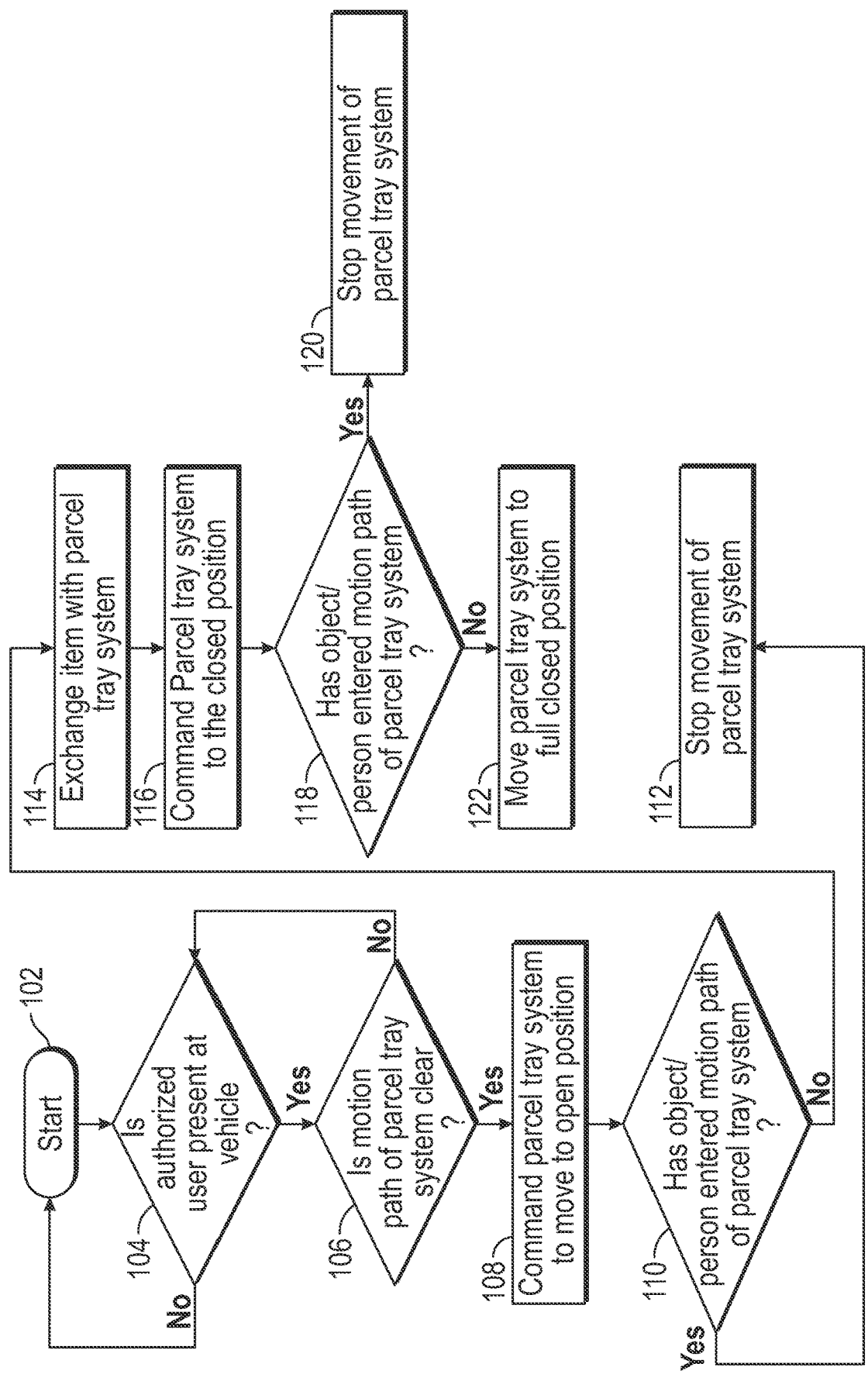
FIG. 10 schematically illustrates an automated method for controlling a vehicle parcel tray system for exchanging goods or other items between an authorized user and the vehicle.

FIG. 10, with continued reference to FIGS. 1-9D, schematically illustrates a method 100 for controlling the parcel tray system 18 of the vehicle 10 as part of an automated process for exchanging goods or other items between user and the vehicle 10. In an embodiment, the control module 58 of the parcel tray system 18 is programmed with one or more algorithms adapted to execute one or more steps of the exemplary method 100.

The exemplary method 100 begins at block 102. At block 104, the control module 58 may determine whether an authorized user who desires to pick-up or place a package or other goods from/within the tray 20 of the parcel tray system 18 is present at the vehicle 10. For example, the control module 58 may receive the predefined prompt 60 when the user authenticates themselves using either an external keypad located on vehicle or a personal electronic device (e.g., smart phone) that is capable of communicating with the control module 58 through an application stored in the memory of the personal electronic device, for example.

If a YES flag is returned at block 104, the method 100 may proceed to block 106 by determining whether a motion path of the parcel tray system 18 is clear for opening. The control module 58 may communicate with various on-board sensors or cameras of the vehicle 10 for making this determination. If the motion path is determined to be clear, the control module 58 may command the electric linear actuator 34 to move the parcel tray system 18 to the open position at block 108.

The control module 58 may continue to monitor the movement of the parcel tray system 18 to determine if an object or person has entered the motion path of parcel tray system 18 at block 110. If YES, the movement of the parcel tray system 18 is automatically stopped at block 112. If however no object is detected in the motion path, the method 100 may proceed to block 114, at which time the authorized user may exchange item (e.g., pick-up or drop-off) with the parcel tray system 18 of the vehicle 10.

The parcel tray system 18 may next be commanded to the closed position at block 116. The control module 58 may continue to monitor the movement of the parcel tray system 18 to determine if an object or person has entered the motion path of parcel tray system 18 at block 118. If YES, the movement of the parcel tray system 18 is automatically stopped at block 120. If NO, the parcel tray system 18 is moved to the fully closed position at block 122.

The vehicle parcel tray systems described herein provide a simple and robust manner for achieving the automated opening and closing of hinged vehicle closure members. The proposed systems and methods increase the speed of the exchange of goods or other items between authorized users and the vehicle.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A vehicle parcel tray system, comprising:
   a closure member;
   a parcel tray mounted to the closure member;
   an actuator system adapted to move the closure member and the parcel tray in unison with one another; and
   at least two support devices disposed between a platform of the parcel tray and a vehicle body structure,
   wherein the at least two support devices include roller balls.

2. The vehicle parcel tray system as recited in claim 1, wherein the closure member is a vehicle side door.

3. The vehicle parcel tray system as recited in claim 1, wherein the parcel tray is mounted to the closure member by an attaching plate.

4. The vehicle parcel tray system as recited in claim 1, wherein the actuator system includes an electric linear actuator, a roller wheel assembly, and a track.

5. The vehicle parcel tray system as recited in claim 4, wherein the roller wheel assembly is pivotably connected to the electric linear actuator.

6. The vehicle parcel tray system as recited in claim 4, wherein a roller wheel of the roller wheel assembly is movably received within the track.

7. The vehicle parcel tray system as recited in claim 6, wherein the track is fixedly mounted to an interior side of the closure member or to an attaching plate that is mounted between the parcel tray and the interior side.

8. The vehicle parcel tray system as recited in claim 6, wherein the roller wheel is configured to move in each of a first direction and a second direction within the track.

9. The vehicle parcel tray system as recited in claim 1, wherein the parcel tray includes the platform and at least one shelving unit.

10. The vehicle parcel tray system as recited in claim 1, comprising a control module configured to control movement of the closure member and the parcel tray in unison with one another as part of an automated delivery process.

11. A vehicle, comprising:
    a vehicle body;
    a closure member pivotably mounted relative to the vehicle body;
    a parcel tray mounted relative to the closure member; and
    an electric actuator system configured to move the closure member and the parcel tray in unison with one another over a range of motion between a closed position and an open position,
    wherein the electric actuator system includes an electric linear actuator, a roller wheel assembly, and a track.

12. The vehicle as recited in claim 11, wherein the vehicle is an autonomous vehicle.

13. The vehicle as recited in claim 11, wherein the roller wheel assembly is pivotably connected a drive shaft of the electric linear actuator and includes a roller wheel movably received within the track for establishing an adjustable connection point between the closure member and the electric linear actuator.

14. The vehicle as recited in claim 13, wherein the track is secured to an attaching plate that is mounted to the closure member.

15. The vehicle as recited in claim 11, wherein the parcel tray is supported relative to a structure of the vehicle body by at least two support devices.

16. The vehicle as recited in claim 11, comprising a control module configured to command the electric actuator system to move the closure member and the parcel tray in unison in response to receiving a predefined prompt that indicates an authorized user desires to exchange an item with the vehicle.

17. A method, comprising:
    automatically deploying a parcel tray as a vehicle closure member is moved from a closed position to an open position,
    wherein automatically deploying the parcel tray includes moving a roller wheel of an actuator system within a track that is secured relative to the vehicle closure member.

* * * * *